Dec. 9, 1924.

H. ALLISON

FIGURE WHEELED TOY

Filed April 27, 1921

1,518,725

INVENTOR
Harvey Allison
BY
Chas. W. Mortimer
ATTORNEY

Patented Dec. 9, 1924.

1,518,725

UNITED STATES PATENT OFFICE.

HARVEY ALLISON, OF NEW YORK, N. Y.

FIGURE WHEELED TOY.

Application filed April 27, 1921. Serial No. 464,940.

*To all whom it may concern:*

Be it known that I, HARVEY ALLISON, a citizen of the United States, residing at New York city, in the county of New York and State of New York, have invented certain new and useful Improvements in a Figure Wheeled Toy, of which the following is a specification.

This invention relates to a toy in which a four-footed animal, such as a horse for example, is attached to a wheeled vehicle and is caused to move forward in such a manner as to simulate a galloping horse.

One of the objects of the invention is to construct a device of this character which shall be cheap to manufacture and will not readily get out of order. Another object is to produce a device of the character described which, when moved will attract attention and give a pleasing effect by simulating a galloping horse or other animal. Another object is to produce a device wherein a cam or its equivalent on a wheeled vehicle is caused to operate in conjunction with the animal that is attached to the vehicle in such a manner that the animal will be alternately supported upon its front and rear legs and will also be caused to gallop or leap.

The invention will be understood from the description in connection with the accompanying drawings, in which an embodiment of the invention is shown and in which the same reference characters refer to the same parts in the several views. In the drawings Fig. 1 is a top plan view of the device.

Figure 1:
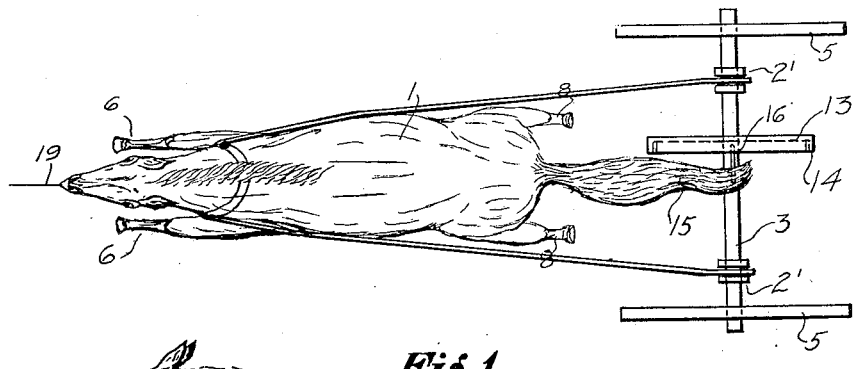

Reference character 1 indicates a horse or other four-footed animal that is attached by shafts 2 to the axle 3 of a carriage or wheeled vehicle. The shafts 2 are pivotally connected to some part of the animal, for example at 4, near its neck, so as to maintain the animal in an upright position, thereby permitting it to be moved in such a way as to simulate galloping. The shafts 2 may be maintained in position on the axle 3 by means of collars 2' on the shaft. The axle 3 passes loosely through the ends of the shafts 2 and the wheels 5 are rigidly connected to the axle 3, so that as the wheels 5 turn, the axle 3 will also be turned.

The front legs 6 of the animal are connected together by pin 10 to move in unison and are pivoted to the animal 1 at the point 7. The rear legs 8 of the animal are similarly connected by a pin 12 to move in unison and are pivoted to the animal at 9. The pin 10 of the front legs 6, which is below the pivot point 7, is connected by means of a rod or bar 11 to a pin 12 of the rear legs 8 above the pivot point 9, so that as the front pair of legs is moved forward, the rear pair will be moved backwards and viceversa. Other devices to make the front and rear legs move in opposite directions may be used. The lower portion of the animal 1 may be hollowed out or slotted longitudinally, as shown at 11', to accommodate the rod 11 so that same will not be visible from the side. The pins 10 and 12 operate in slots 10' and 12' in the sides of the animal, and the length of said slots may be made to determine the limits of movement of the legs.

Upon the axle 3 is rigidly mounted a cam 13 to turn when the wheels 5 are turned. The cam 13 is provided with a flange 14 of such curvature that it will operate upon a rigid member attached to the animal 1, such for example as the tail 15, to cause the same to be moved up and down at predetermined intervals as the cam 13 is turned. For this purpose a pair of pins 16 extend from near the end of the tail 15 in a horizontal direction so as to straddle the flange 14 of the cam 13 as clearly seen in Fig. 4. Instead of using the tail 15 of the animal to be operated upon or moved up and down by the cam 13, a rod or other rigid member may extend from the animal 1 and be operated or moved up and down by the cam 13 or equivalent device, for a purpose to be more fully described below.

Figure 3:
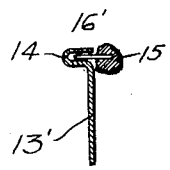
Fig. 3 is a view partly in section showing a detail.
Figures 4, 5:
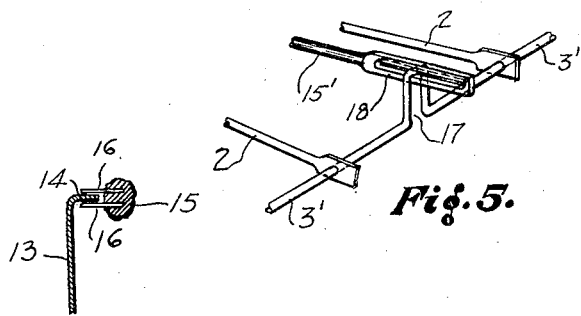
Fig. 4 is a similar view showing a modification of a detail.
Fig. 5 is a perspective view of a modification of a portion of the device.

Instead of having the cam 13 provided with a flange 14, as indicated in Fig. 4, the cam 13', as indicated in Fig. 3, may be provided with a curved portion 14' along its periphery to form a groove in which a single pin 16' from the tail 15 or other rigid member operates in an analogous manner to that above described.

Figure 2:
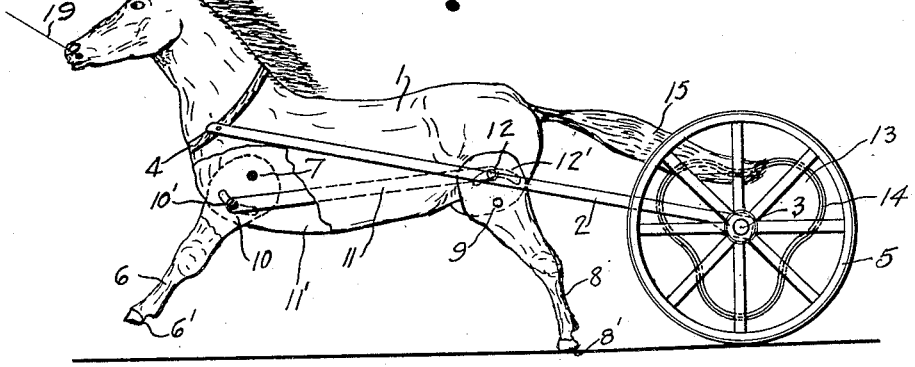
Fig. 2 is a side view of the same partly broken away.

As shown in Fig. 5, the cam 13 may be entirely dispensed with, and the shaft 3' may be provided with a crank 17 which works in a slot 18 in the rod 15', which may be substituted for the tail 15 and be rigidly connected to the animal 1. When the shaft 3' is turned, the rod 15' will be moved up and down similar to the way the tail 15, shown in Fig. 2, is moved up and down, except that in the particular illustrations shown the tail 15 in Fig. 2 will be moved up and down three times for one revolution of the shaft 3 and cam 13 while the rod 15' will be moved up and down once for each revolution of the shaft 3' and crank 17. The number of oscillations per revolution of shaft 3 due to the shape of the cam 14 can be varied to suit the conditions, and the distance traveled over per oscillation is a function of the diameter of the wheels 5.

The operation is as follows:

The animal 1 shown in the position indicated in Fig. 2 may be drawn along a supporting surface by means of the cord 19 with the rear feet contacting with the supporting surface. As the cam 13 is turned slightly, due to the forward movement, the flange 14 thereof, working upon the pins 16, will cause the front end of the animal to be lowered, thus making the front feet 6 come into contact with the supporting surface, whereupon a further slight turning of the cam 13 will raise the rear legs 8 from the supporting surface, causing the legs 6 that are now resting upon the supporting surface to turn upon their pivot 7, thus drawing the rear legs forward and causing the same to be swung upon their pivot 9 while they are raised in the air. As the cam 13 continues to operate, the rear end of the animal will be lowered until the legs 8 come into contact with the supporting surface and a further slight turning of the cam will cause the front legs 6 to be raised, whereupon the rear legs 8 resting upon the supporting surface will be turned rearwards about their pivot point 9, thus causing the front legs to be thrown forward while the front end of the animal is lifted and the front legs are in the air. This operation is repeated over and over, so that the movement of the animal 1 simulates a galloping animal. In order to render the operation more certain, the feet of the animal may be provided with rubber coverings 6' and 8' respectively to prevent them from sliding along the supporting surface.

Instead of having the legs pivoted to the animal 1, as indicated, so that the body of the animal is oscillated as described, the lower portion of the animal may be loosely connected with the body of the animal as a whole, and the legs may be pivoted to the lower portion and this lower portion be made to operate as above indicated for the animal. The lower portion, as just mentioned, may be split into two sections and the legs on the respective sides may be connected so as to operate as above described for the set of legs. Instead of drawing the device along by means of the cord 19, it may be driven by attaching a spring or other motor to the axle or wheels or other parts of the device for propelling the same along a supporting surface. Other changes and modifications may be made without departing from the spirit or scope of the invention.

I claim:

1. In a device of the character described, a body having pivoted members for supporting said body on a supporting surface, a member rigidly connected to said body, means to move the end of said last named member up and down and also in a longitudinal direction with respect to said supporting surface, and means to connect said body and first named means.

2. In a device of the character described, a body, front and rear supporting members each pivoted to said body, and means to move said body along a supporting surface and means attached to the rear end of said body, said means being positively moved up and down to cause said body to be automatically supported alternately upon said front and rear supporting members.

3. In a device of the character described, a body having pivoted members in tandem which support said body and means including a rigid connection to said body, means for moving said rigid connection up and down to tilt said body alternately upon said supporting members.

4. In a device of the character described, a body having pivoted supporting members, a vehicle, a member rigidly connected to said body and extending from said body to said vehicle, and means on said vehicle for moving the end of said rigidly connected member up and down while said supporting members are alternately supported on a supporting surface.

5. In a device of the character described, a body having front and rear pivoted members which operate as supports for said body, a wheeled vehicle having an axle provided with operating means, a rod connecting said body to said operating means, said rod being rigidly connected to said body and shafts connecting said body to said axle.

6. In a device of the character described, a body having pivoted members in tandem which operate as supports for said body, and means including a member rigidly connected to the rear end of said body to raise and lower said end positively so that said body is alternately supported entirely upon the front and rear pivoted members.

7. In a device of the character described, a body having members in tandem pivoted to said body, which members operate as supports for said body, and a rod rigidly connected to said body to cause one of its ends to be alternately raised and lowered as said body is caused to advance.

8. In a device of the character described, a body having members pivoted to said body, means connected to said members to reciprocate the same in opposite directions and reciprocatory means to rock said body to shift the fulcrum of leverage with the supporting surface from one member to another and means to reciprocate said rocking means.

9. In a device of the class described, a shaft supported on wheels, a body, members pivoted to said body, said members being arranged in tandem, and a member rigidly connected to said body, said shaft carrying means for reciprocating said member in an up and down direction.

10. In a device of the character described, a body having pivoted members in tandem which support said body, a rod connected to said members to receiprocate the same in opposite directions, a wheeled vehicle, a cam operated by said vehicle, a rigid connecting member extending from said body to said cam and operated by said cam to cause said body to be supported alternately upon said supporting members on a supporting surface.

In testimony whereof I affix my signature.

HARVEY ALLISON.